United States Patent [19]

Cooper

[11] Patent Number: 4,502,765
[45] Date of Patent: Mar. 5, 1985

[54] LENS SUPPORT SYSTEM

[76] Inventor: George F. Cooper, 2406 Halcyon Ave., Baltimore, Md. 21214

[21] Appl. No.: 377,952

[22] Filed: May 13, 1982

[51] Int. Cl.$^3$ ............................ G02C 1/02; G02C 5/00
[52] U.S. Cl. ....................................... 351/110; 351/141
[58] Field of Search ............... 351/178, 154, 135, 121, 351/110, 141; 2/442, 443

[56] References Cited

U.S. PATENT DOCUMENTS 2,080,282  5/1937  Levigton ............................ 351/143

Primary Examiner—Rodney B. Bovernick
Attorney, Agent, or Firm—Morton J. Rosenberg

[57] ABSTRACT

A lens support system (10) for rigidly securing a lens (12, 12') to a bridge mounting member (14) or an end piece member (14'). The lens (12, 12') includes a longitudinally extended slot (28) passing through the lens (12, 12') in a vertical direction (18) and defining longitudinally displaced end sections (30 and 32). The lens support system (10) includes a pair of vertically extending post members (50 and 52) which are mounted on an annular disk member (34) having a central opening (44). The post members (50 and 52) extend through the slot (28) and the post members (50, 52) matingly engage the end sections (30, 32) of the slot (28). The longitudinally displaced post members (50 and 52) prevent rotation of the lens (12, 12') about a vertical axis. A threaded member (60) extends through the central opening (44) of the disk member (40) and is compressively engaged with upper surfaces of the posts (50 and 52) by threaded securement of a nut member (66) threadedly engaging a lower portion of the threaded member (60). In this manner, the lens (12, 12') is rigidly secured to frame mounting member (14) in both compressive force loading, as well as providing a means whereby lens (12) is rotationally constrained with respect to the frame mounting member (14) about a vertical axis.

9 Claims, 3 Drawing Figures

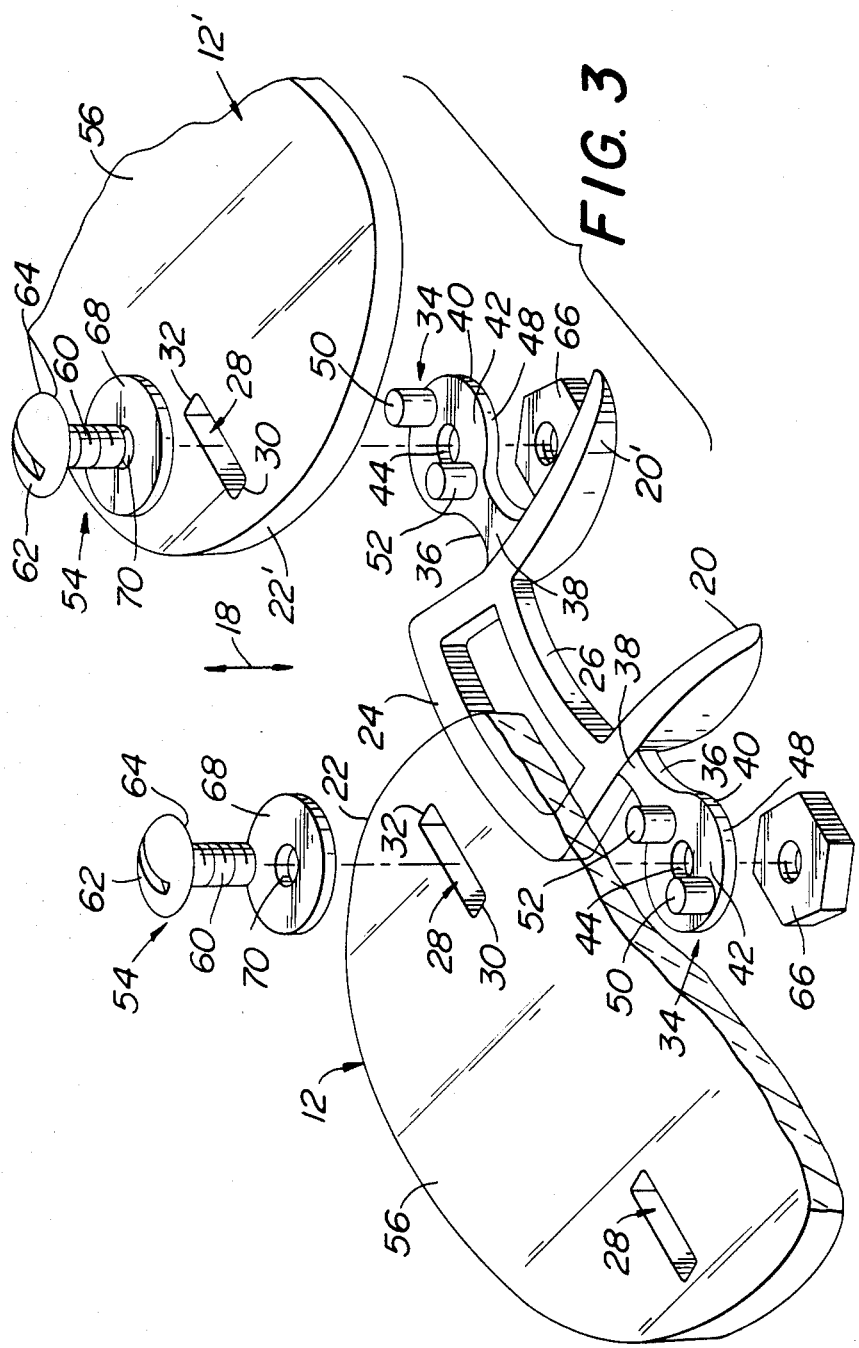

LENS SUPPORT SYSTEM

BACKGROUND OF THE INVENTION

1. Field of the Invention

This invention pertains to load bearing support systems. In particular, this invention relates to a support system for rigidly constraining a lens to a frame mounting member. More in particular, this invention pertains to a lens support system for rigidly constraining an eyeglass lens to either a bridge mounting member or an end piece member. Further, this invention relates to a lens support system which prevents rotation of the lens with respect to the frame mounting member to which it is coupled. Still further, this invention pertains to a lens support system which is compressively coupled to the lens member of a pair of eyeglasses. More in particular, this invention pertains to a lens support system wherein a pair of displaced post members extend through a longitudinally directed slot formed within the lens to prevent rotation about a vertical central axis passing through the slot. Additionally, this invention pertains to a load support system where a threaded member passes adjacent to the displaced post members and extends downwardly through an annular disk member through the slot formed in the lens and threadedly coupled by a nut member.

2. Prior Art

Eyeglass lens mounting systems are known in the prior art. Additionally, mounting systems wherein the mounting members pass through the lens are also known in the prior art. The closest prior art known includes U.S. Pat. Nos. 1,068,959; 829,268; 2,011,906; 2,301,328; 2,080,282; 2,078,589; 751,939; 683,108; 1,213,324; and, 1,537,489.

In prior art U.S. Pat. No. 1,068,959, a lens support system is shown which includes a pair of openings adjacent each to the other which are formed through the lens. Posts are passed through the openings and the support is provided by extension members passing through slots that are formed in the posts. However, the posts are on V-shaped arm members and are not directed to provide a rotational restraint by passing through one slot formed in the lens which is then additionally compressively loaded.

U.S. Pat. No. 829,268 provides a lens mounting which has eyelet sections on a first end so that threaded members may be mounted through the glass lenses. However, such prior art does not provide for the threaded member passing through and matingly engaging posts which prevent rotation of the mounting with respect to the lens.

In some prior art such as that shown in U.S. Pat. No. 2,011,906, there are enlarged section members which include openings to allow the reception of threaded members. Such enlarged sections do pass on opposing sides of the lenses, however, such do not provide for spaced apart post members to prevent rotation of the mounting with respect to the lenses.

In other prior art systems, such as that shown in U.S. Pat. No. 2,080,282, support systems having prongs which are coupled on opposing sides of the lenses are shown which provide some lateral stability. Bolt members pass through eyelet sections for the arm support members but do not provide for the compressive and rotational constrainment shown by the subject lens support system.

In other systems, such as that shown in U.S. Pat. No. 751,939, lens fastening systems are provided which include opposing clips having square or rectangular-like appendages insertable within respective square or rectangular openings formed in the lens. Threaded screw members pass through eyelet sections for securement purposes. Such square or rectangular openings mating with respectively contoured nut members are apparently provided to minimize rotation, however, such does not provide for the optimized rotation constrainment and compressive loading as provided in the lens support system of the subject concept.

SUMMARY OF THE INVENTION

A lens support system which includes a frame mounting member. A lens member having a longitudinally extending slot passing therethrough defines longitudinally displaced end sections. A mechanism is provided for coupling the frame mounting member to the lens member. The coupling mechanism extends through the longitudinally extended slot in substantially mating engagement with the displaced slot end sections for preventing rotation of the coupling mechanism about a vertically directed axis.

DESCRIPTION OF THE PREFERRED EMBODIMENTS

Figure 1:
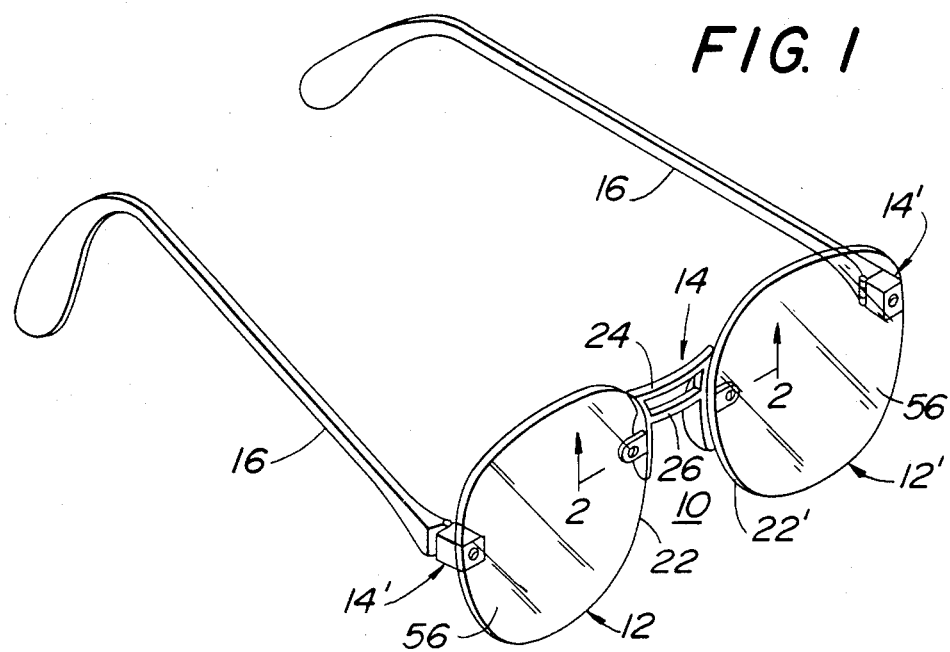
FIG. 1 is a perspective drawing of a pair of eyeglasses having the lens support system mounted thereon.
Figure 2:
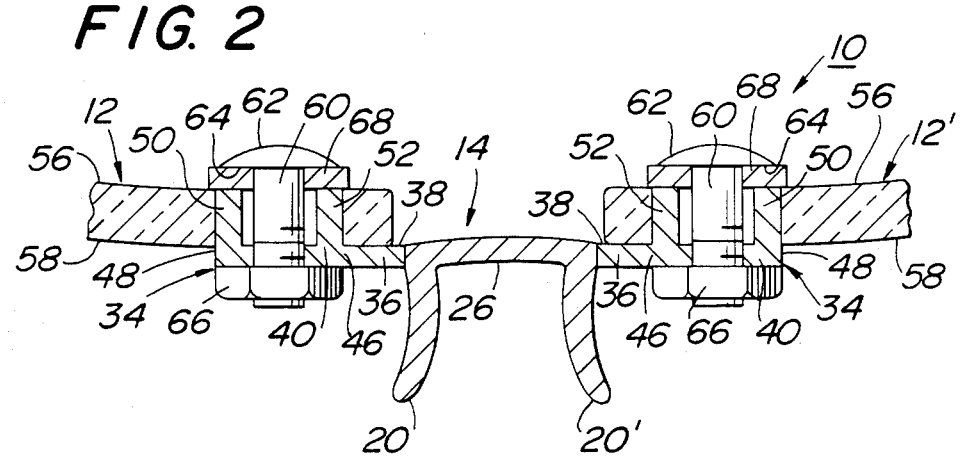
FIG. 2 is a cross-sectional drawing of the lens support system taken along the section line 2—2 of FIG. 1 and, FIG. 3 is a perspective exploded view of the lens support system showing cooperation with both a bridge mount and a pair of opposing lenses.

Referring now to FIGS. 1-3, there is shown lens support system 10 for rigidly securing lens member 12 to frame mounting member 14. As is shown in FIG. 3, frame mounting member 14 may be a bridge mounting member or as shown in FIG. 1, may be end piece member 14' pivotally secured to ear piece member 16.

In overall concept, lens support system 10, as will be described in following paragraphs, secures lens 12 to frame mounting member 14 or 14' in a manner to minimize relative rotation about an axis defined by vertical direction 18, as well as compressively securing frame mounting member 14 or 14' to lens 12 in an optimized manner. Lens support system 10 is particularly adapted to, but not limited to, what is commonly referred to as a three piece mounting of eyeglasses. The three piece mounting concept provides for the bridge mounting member 14 coupled on opposing transverse edges to a pair of lenses 12, as well as a pair of end piece members 14' mounted to opposing lenses 12, which provides for the three piece mounting system. Thus, in this coupling type mode, there are provided two end piece members 14' and one bridge mounting member 14, constituting the constituent components of the system.

Use of a three piece mounting system is generally advantageous, since such allows for adjustments relating to the contouring of the eyeglasses to a particular user's head contour in a manner which is generally much more difficult in other mounting type systems due to the fact that such generally provide for additional rigid body components which may not be bent in an easy manner. However, prior art three piece mounting systems generally suffer from the disadvantage of being easily loosened during normal use as well as not providing for a secure coupling between frame mounting members 14 and lenses 12. Additionally, other prior art three piece mounting systems do not provide for the load bearing capability of lens support system 10, which diminishes the amount of adjustability that may be made subsequent to the initial coupling and manufacture of the eyeglasses.

Lens support system 10 includes frame mounting member 14 which may be of a standard type well-known in the art. Frame mounting member 14 as shown in FIG. 1, is directed to a bridge mounting member which has opposing arcuately directed legs 20, 20'. Mounting member legs 20 and 20' are adapted to matingly interface with lens curved edges 22, 22'. Bridge mounting member 14 is generally U-shaped in contour and includes upper transversely directed member 24 and central transversely directed member 26 adapted to be placed over the bridge of the nose of a user. Frame mounting member or bridge mounting member 14 may be formed in one-piece construction and generally composed of a metal such as stainless steel, aluminum, or some like material composition not important to the inventive concept as herein described, with the exception that such be able to take the normal stress of the general use of eyeglasses. Additionally, frame mounting or bridge mounting member 14 may be formed in one-piece construction responsive to the particular manufacturing technique being used.

Lens member 12 or 12' includes longitudinally extended slot 28 extending through lens 12 in vertical direction 18 and providing a true passage in vertical direction 18. Slot 28 includes opposing end sections 30 and 32 for use as will be described in following paragraphs. Lens 12 or 12' may be of standard composition and formed of a generally transparent material. The transparent composition member may be chosen from the group consisting of plastic, glass, or a sub-class of plastic which is commonly referred to as polycarbonate. The use of polycarbonate compositions has recently come into prominence, due to the high stress load capabilities associated with this type of material composition. Although it is evident that lenses 12 and 12' are generally contoured in a convex or concave shaping, for the purposes of this disclosure, lenses 12 and 12' will be generally considered as substantially horizontally planar lying in a substantially perpendicular direction to vertical direction 18. These approximate assumptions are only being made in order to allow for reference contouring and directions to be described.

Lens support system 10 further includes coupling mechanism 34 for rigidly coupling frame mounting member 14 to lens members 12 or 12'. Coupling mechanism 34 extends through longitudinally extended slot 28 and substantially matingly engages displaced longitudinal slot end sections 32 and 30 for preventing rotation of coupling mechanism 34 about vertically directed axis 18. Thus, as will be seen, lenses 12 and 12' are substantially maintained in constrained relation with respect to frame mounting member 14 and lenses 12 and 12' with regard to a rotational displacement.

Coupling mechanism 34 includes coupling arm 36 which is fixedly secured to frame mounting member 14 and specifically to mounting member legs 20 or 20' on a first end 38. Coupling arm member 36 first end 38 is secured to curved or arcuately directed mounting member legs 20 or 20' by welding, soldering, or some like rigidly securing technique, not important to the inventive concept as is herein described.

Coupling mechanism 34 further includes annular disk member 40 shown in FIG. 3, having a closed contour upper surface 42 and disk central opening 44. Annular disk member 40 is coupled to coupling arm member 36 in secured fashion at second end 46 of coupling arm member 36. Securement of second end 46 of coupling arm member 36 may be formed on lateral sidewall 48 of disk member 40 through welding, soldering, or some like technique, however, it is to be understood that coupling arm member 36 may be formed in one-piece construction with annular disk member 40, if manufacturing techniques so necessitate.

Coupling mechanism 34 further includes vertically extending post members 50 and 52 secured to upper surface 42 of annular disk member 40 on diametrically opposed sides of upper surface 42. Post members 50 and 52 are shown to be cylindrically contoured posts, however, such geometry is not necessitated by the inventive concept of this disclosure, however, posts 50 and 52 do pass through slot 28 and are displaced each from the other in a manner to form mating engagement with slot end sections 30 and 32. Thus, the diameter of each of post members 50 and 52 should be substantially the same as the width of slot 28, however, possibly such diameter should be slightly less than the width of slot 28 in order to allow free passage therethrough. As can be seen, mating engagement with opposing end sections 30 and 32 of slot 28 prevents rotation of coupling mechanism 34 about vertical direction 18 when taken with respect to lenses 12 or 12'. Post members 50, 52, annular disk member 40, and associated coupling arm member 36 may be formed of stainless steel, aluminum, or some like material not important to the inventive concept as herein described, however, such must be adaptable for rigid securement to frame mounting member 14 and also able to accept the normal stress of user wear of a pair of eyeglasses.

Lens support system 10 further includes releasable securement mechanism 54 which is mounted to opposing lens member surfaces 56 and 58. Releasable securement mechanism 54 passes through slot 28 and compressively secures coupling mechanism 34 to lens members 12 and 12'.

Releasable securement mechanism 54 includes threaded member 60 having head portion 62 creating shoulder 64 of a diameter greater than the diameter of threaded portion of threaded member 60. Threaded member 60 passes through disk member central opening 44 and between post members 50 and 52. Head 62 is adapted to compressively be mounted on post members 50 and 52 by interface with head shoulder section 64. Threaded member 60 has a vertical dimension in vertical direction 18 greater than the vertical direction dimension of coupling mechanism 34, and lenses 12 and 12' in order that threaded member 60 be secured to lenses 12 and 12' by threaded nut member 66 which threadedly engages threaded member 60.

Washer member 68 having central opening 70 of substantially the same diameter as the central opening 44, is mounted on an upper surface of posts 50 and 52 and interfaces on an upper surface with head shoulder 64.

In operation and construction, coupling mechanism 34 is mounted to frame mounting member 14 or 14', as has hereinbefore been described. The combination of frame mounting member 14 or 14' and coupling mechanism 34 are located in order that post members 50 and 52 are inserted below lens surface 58 and post members 50 and 52 pass upward, extending above upper lens surface 56. Washer member 68 is mounted on the upper surfaces of post members 50 and 52 and threaded member 60 is passed through washer opening 70, between post members 50 and 52, through lenses 12 or 12', and then pass through disk central opening 44 extending downwardly therefrom in vertical direction 18. Nut member 66 is then cooperatively threaded with threaded member 60 to compressively load coupling mechanism 34 to lenses 12 and 12'. Post members 50 and 52 being displaced each from the other for mating engagement with slot end sections 30 and 32 prevent rotation of lenses 12 or 12' with respect to frame mounting members 14 or 14'.

Although not important to the inventive concept as herein defined, the dimensions of post members 50 and 52 approximate 0.9 mm in diameter. Additionally, central disk opening 44 and washer opening 70 approximate 1.0 mm. The overall dimension of washer member 68 is approximately 2.8 mm with a surface width approximately 0.9 mm for mounting to the upper surfaces of posts 50 and 52, as well as the undersurface of shoulder 64. The threaded diameter of threaded member 60 approximates 0.9 mm for passage through openings 70 and 44 for mating engagement with threaded nut 66.

Particularly, lens support system 10 has an optimized use when taking into consideration lenses 12 and 12' formed of a polycarbonate plastic material. Such polycarbonate plastic lenses now commercinally available in the marketplace provide for greater strength than those of prior art plastic compositions. Thus, this polycarbonate plastic taken in combination with lens support system 10 allows for a three piece mounting system which generally has substantially the same strength characteristics as a completed metal frame, however, additionally, such allows for a plurality of differing design possibilities which increase aesthetic considerations as well as providing for a greater market acceptability.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:
1. A lens support system comprising:
 (a) a frame mounting member;
 (b) a lens member having a longitudially extending slot passing therethrough, defining longitudinally displaced end sections; and,
 (c) means for coupling said frame mounting member to said lens member, said coupling means including a pair of post members rigidly constrained each with respect to the other, said post members extending through said longitudinally extended slot in substantially mating engagement with said displaced slot end sections for preventing relative rotation of said coupling means with respect to said lens member about a vertically directed axis.

2. The lens support system as recited in claim 1 where said means for coupling said frame mounting member to said lens member includes lens releasable securement means mounted to opposing lens member surfaces through said slot for compressively securing said coupling means to said lens member.

3. The lens support system as recited in claim 2 where said means for coupling said frame mounting member to said lens member includes:
 (a) a coupling arm fixedly secured to said frame mounting member on a first end thereof; and,
 (b) an annular disk member having a central opening fixedly secured to said coupling arm on a second end thereof, said pair of post members being secured to said annular disk member on opposing sides of said central opening.

4. The lens support system as recited in claim 2 where said lens releasable securement means includes:
 (a) a threaded member passing through said disk member central opening and between said post members, said threaded member having a head portion adapted to compressively mount on said post members; and,
 (b) a nut member for threadedly engaging said threaded member.

5. The lens support system as recited in claim 4 including a washer member mounted between said threaded member head portion and said post members.

6. The lens support system as recited in claim 5 where said threaded member includes a head section defining a shoulder portion adapted to compressively load an upper surface of said washer member.

7. The lens support system as recited in claim 1 where said frame mounting member is an eyeglass bridge mounting member.

8. The lens support system as recited in claim 1 where said frame mounting member is an eyeglass earpiece mounting member.

9. The lens support system as recited in claim 1 where said lens member is formed of a substantially transparent composition member from the group consisting of plastic, glass and polycarbonate.

* * * * *